United States Patent [19]

Tiberg

[11] 4,359,434

[45] Nov. 16, 1982

[54] PROCESS FOR GRANULATING MOLTEN MATERIAL

[75] Inventor: Nils Tiberg, Oxelösund, Sweden

[73] Assignee: Svenskt Stal Aktiebolag, Stockholm, Sweden

[21] Appl. No.: 116,672

[22] PCT Filed: Sep. 5, 1978

[86] PCT No.: PCT/EP78/00014
§ 371 Date: May 7, 1979
§ 102(e) Date: May 7, 1979

[87] PCT Pub. No.: WO79/00132
PCT Pub. Date: Mar. 22, 1979

[30] Foreign Application Priority Data

Sep. 6, 1977 [DE] Fed. Rep. of Germany ....... 2740097

[51] Int. Cl.³ .............................................. B01J 2/16
[52] U.S. Cl. ......................................... 264/7; 264/12; 264/DIG. 51
[58] Field of Search ...................... 264/12, 7, DIG. 51

[56] References Cited

U.S. PATENT DOCUMENTS

| | | | |
|---|---|---|---|
| 3,532,775 | 10/1970 | Brondyke et al. | 264/12 |
| 3,533,776 | 10/1970 | Coates | 264/7 |
| 3,655,837 | 4/1972 | Reed et al. | 264/7 |
| 4,011,290 | 3/1977 | Blomqvist et al. | 264/12 |
| 4,238,427 | 12/1980 | Chisholm | 264/7 |

*Primary Examiner*—James R. Hall
*Attorney, Agent, or Firm*—Antonelli, Terry & Wands

[57] ABSTRACT

A process for granulating slag melts, glass melts, ceramic melts, metal melts and melts of metal alloys, particularly blast furnace slag melts, the melt being shaped into at least one thin, liquid melt stream moving freely in a predetermined direction and which, by meeting at a predetermined incidence angle with a stream of fine-grained, solid particles and/or gas, particularly inert gas, flowing substantially freely in a substantially uniform direction at a high rate of flow in relation to the melt stream or melt streams, being converted at least partly into a substantially fine-grained granulate having a fan-shaped distribution over at least part of the opposite angle to the incidence angle.

37 Claims, 3 Drawing Figures

PROCESS FOR GRANULATING MOLTEN MATERIAL

This invention relates to a process for granulating melts, particularly glass melts, ceramic melts, metal melts and melts of metal alloys, and may be applied with particular advantage to the granulation of blast furnace slag melts. The invention also relates to the production of an improved granulate.

In the case of metallurgical slags, the melt is frequently poured into a ladle which is carried to the slag dump where the slag is either removed from the ladle in the form of an already hard block or is cast in liquid form and left to harden on the dump. In many cases, slag melts are also converted into granulate by one of the known quick-cooling techniques, for example by pouring the slag into water. The first of these processes is uneconomical and results in atmospheric pollution. By contrast, the second process is more economical because the granulate may be used inter alia as an additive, for example as an aggregate for concrete.

However, all conventional processes for granulating melts, particularly slag melts, are attended by disadvantages and deficiences including inter alia loss of the heat content of the slag melt. In addition, the granulate can only be used to a more or less limited extent depending on the particular process adopted. Moreover slag and metal melts are extremely difficult to granulate in water on account of the danger of explosion. For this reason, steel slags for example are not granulated in water. By contrast, pig iron is granulated in water, although large quantities of water are required, in addition to which elaborate safety measures have to be taken.

The object of the present invention is to provide a process for granulating slag melts, glass melts, ceramic melts, metal melts and melts of metal alloys, particularly blast furnace slag melts, which enable the melts to be granulated without having to be kept hot for prolonged periods, i.e. without any need for additional energy. Additional objects include provisions for the granulate to be divisible into fractions having different properties and for a controllable reaction and/or association between the melt and fine-grain particles.

According to the invention, this object is achieved in that the melt is shaped into a melt film moving freely in a predetermined direction and is caused to intersect at a predetermined incidence angle a with a faster moving stream of fine-grained, solid particles and/or gas (particularly inert gas), and is thus atomized into a fan-shaped distribution of droplets over at least part of the opposite angle b to the incidence angle a.

The process according to the invention affords the advantage that granulation can be carried out in the open without any danger of explosion and the further advantage that the fan-shaped distribution of the droplets (which cool into fine-grained granulate) makes the hot granulate easier to collect in a fluidized bed.

According to the invention, the granulate may be divided into fractions on collection in dependence upon the distance between the point of collection and the point at which the flow of melt meets the stream. In this way, the granulate may be divided up into fractions differing in their properties, particularly their grain size, density and/or material composition. This is of particular advantage in cases where it is intended to granulate metal melts or melts having a considerable metal content and to separate completely metallic or predominantly metallic granulate particles from partly metallic or non-metallic granulate particles.

The process according to the invention affords the further advantage that the solid fine-grained particles, by digestion and/or inclusion in the still liquid melt, are firmly united with the melt in the granulate, so that a permanent unbreakable connection is established between the melt and the solid particles. The process according to the invention affords the further advantage that predetermined reactions can take place between the melt and the solid particles.

The incidence angle a between the flow of melt and the stream is preferably an acute angle advantageously amounting to between about 5° and 90° and preferably to between about 20° and 90°. Incidence angles a of from about 20° to 40° or from about 50° to about 70°, preferably about 60°, have proved to be of particular advantage.

According to the invention, the solid fine-grained particles of the stream may consist of at least one material to be added to and mixed with the melt, so that the granulate preferably has a fixed mixing ratio between the proportion of melt and the proportion of fine-grained solid particles, as required for a following treatment process, particularly a mineral wool spinning process, carried out directly or following the addition of more material, or for the production of fertilizers.

In the process according to the invention, it is of advantage for the melt to be spread out to form a thin liquid melt film having a thickness of preferably less than 10 mm, advantageously less than 3 mm and more particularly less than 1 mm. It is also advantageous for a stream of fine-grained solid particles to be directed against the melt film, preferably against a widened side thereof at a high speed, preferably at a speed of from about 5 to 100 m/sec, but with greater advantage at a speed of from about 5 to 50 m/sec and, more particularly, at a speed of from about 10 to 20 m/sec, in order to break up the film of melt into droplets which will cool to a substantially fine-grained granulate.

According to the invention, the average diameter of the fine-grained particles is selected to be of substantially the same order of magnitude as and, in particular, substantially equal to the thickness of the melt film, but preferably less than the thickness of the melt film. In the granulation of blast furnace slags by means of sand as the fine-grained material, a grain size of the sand of up to 2 mm and preferably up to 1 mm has proved to be of advantage for producing fine-grained granulate. However, fine-grained material having a grain size of up to 6 mm has also been used for special applications.

According to the invention, the melt may be spread out into a film by means of a flat surface, preferably in the form of a plate of refractory material, particularly graphite. This plate is placed in the path of a melt stream, so that the melt stream spreads out on coming into contact with the plate. In this connection, it can be of advantage to provide boundary strips along the edges of the plate in order laterally to limit the melt stream and to give it a defined width. It has proved to be of particular advantage to vibrate the plate in order to disperse the melt stream into a thin melt film, the amplitude of the vibrations lying in the plane of the surface of the plate. Vibrations such as these in the plane of the baffle surface favorably affects the dispersion of the melt stream into a film. It can also be of advantage to heat the baffle plate for dispersing the melt stream. This may be done for example by means of oil burners (not shown) which may be directed onto the contact surface of the plate. Since, on account of the surface tension of the melt, the film of melt leaving the baffle plate has a tendency to shrink back into a stream of circular cross section, it is of advantage in accordance with the invention to direct the stream of fine-grained particles against the film of melt immediately below the baffle plate. According to the invention, the angle a which the stream of fine particles forms with the melt film may lie between about 20° and 120°, advantageously between about 50° and about 70° and, more particularly, amounts to about 60°. The angle which the stream of fine-grained particles forms with the horizontal is primarily determined by the above-mentioned angle between the melt film and the stream of solid particles and amounts to about 30° when this angle between the film melt and the stream of solid particles amounts to about 60°.

According to the invention, it has provded to be of particular advantage to collect the granulate divided up into fractions.

Since the stream of particles impinges on the slag film with considerable energy, the granulate obtained moves downwards along trajectory parabolas, the slope of the trajectory parabolas corresponding to the kinetic energy imparted to the individual granulate particles by the stream.

In addition, the kinetic energy imparted to the granulate particles corresponds to the mixing ratio between the fine-grained particles and the melt fractions in the granulate. If, therefore, the proportion of fine-grained particles is very high, the kinetic energy imparted to the granulate will be correspondingly high and, hence, the inclination of the trajectory parabolas relatively gentle. Accordingly, the process according to the invention enables certain mixing ratios between melt and fine-grained material to be eliminated from the stream of granulate by the provision of several collecting units below the point at which the particles come into contact with the melt film and at various lateral intervals from this point of contact of the stream of particles with the melt film. Accordingly, fractions of the granulate having substantially consistent mixing ratios between melt and fine-grained material are obtained in these collecting units. The process according to the invention also affords the advantage that inhomogeneities present in the melt, particularly fractions of higher specific gravity, can be collected in a first fraction below the film of melt. This applies in particular to melts of blast furnace slags which in many cases may still contain metallic residues. By virtue of the process according to the invention, these metallic residues are readily separated from the rest of the granulate. In addition, the process according to the invention affords the advantage that parts of the melt or melt film, on which an inadequate quantity of fine-grained particles impinges and which are therefore not dispersed into sufficiently fine-grained granulate, can also be collected in the first fraction substantially immediately below the film of melt and remain separated from the rest of the fine-grained granulated material.

It has proved to be of advantage to adjust a ratio by weight of about 1:1 between the fine-grained material in the stream of particles and the melt. However, it may also be of advantage to adjust a higher ratio, particularly of the order of 2:1. In that case, the excess fine-grained particles are generally collected in the fraction situated furthest away from the point of contact between the stream and the film of melt and may then be reused for producing the stream of fine-grained particles.

It can also be of advantage to collect the granulate or at least one or more fractions of the granulate in a fluidized bed. This fluidized bed may contain the same fine-grained particles as the stream used for dispersing the melt film, the bed being fluidized by the introduction of steam and/or gases, particularly inert gases such as, for example, argon. In a bed fluidized in this way, the granulate may be rapidly cooled and any fractions of the melt which are still liquid may be rapidly hardened.

Embodiments of the invention are described in the following with reference to the accompanying drawings, wherein.

Figure 1:
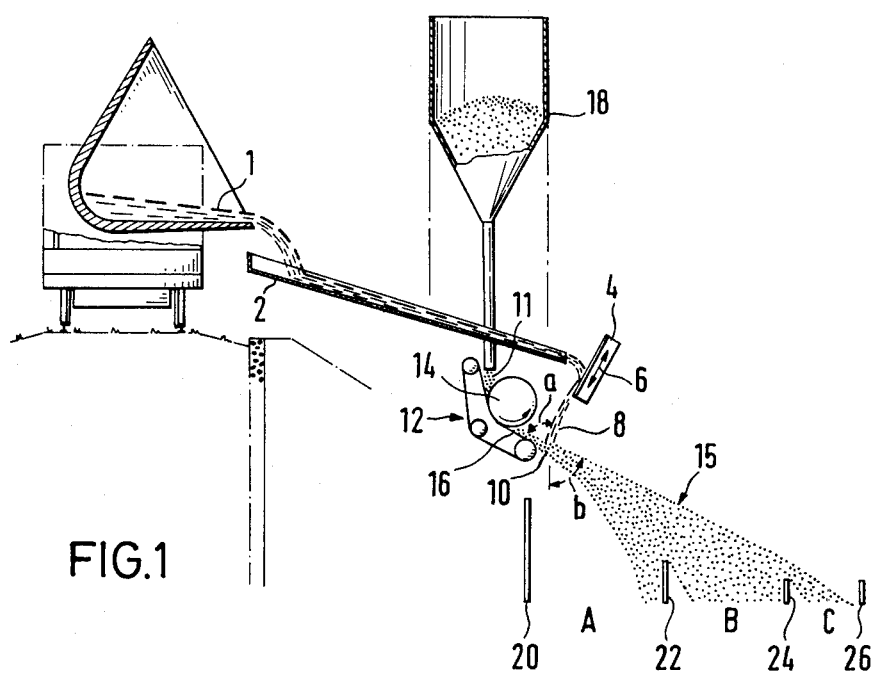
FIG. 1 is a highly diagrammatic view of an apparatus for carrying out the process according to the invention.

The melt 1, which preferably comes direct from the blast furnace in a ladle, is delivered through a sloping channel 2 to a baffle plate 4 to which a vibration drive (not shown) imparts vibrations in the contact plane, preferably in the direction of the arrow 6. However, the vibrations may also be imparted perdendicularly of the arrow 6 or with components both in the direction of the arrow 6 and perpendicularly thereof. On coming into contact with the baffle plate 4, the melt is spread out into a film 8. A stream 10 of fine-grained particles is projected against this film 8 of melt by means of an accelerating unit 12. This accelerating unit 12 consists of a wheel or roller 14 and a projection belt 16. The accelerating unit projects the fine-grained particles against the melt film 8 at a speed of preferably between 5 and 50 meters per second and more particularly at a speed of from 10 to 20 meters per second. The thickness of the melt film 8 preferably amounts to only a few mm and is with advantage less than 5 mm and, more particularly, less than 3 mm, while the width of the melt film is preferably more than 5 cm, more particularly more than 10 cm and, with advantage, between 10 and 30 cm and more particularly, approximately 15 cm. In one practical embodiment of the process according to the invention, a melt stream of blast furnace slag was delivered to the baffle plate 4 at a rate of about 500 to 700 kg/minute and spread into an approximately 15 cm wide film. A stream 10 of fine-grained particles was projected onto this melt film at a rate of 600 to 1200 kg/minute and preferably at a rate of about 1000 kg/minute, resulting in granulation of the melt film, the stream 10 having substantially the same width as the melt film 8.

The angle a between the melt film 8 and the stream 10 of fine-grained particles preferably amounts to between about 50° and 70° and, with advantage, to about 60°. Accordingly, the opposite angle b which the stream 10 forms with the vertical amounts to between about 40° and 20° and, more particularly, to about 30°, if it is assumed that the melt film 8 extends substantially vertically downwards. The granulate 15 is collected in different fractions A, B and C preferably by means of partitions 20, 22, 24 and 26. The fraction A primarily comprises non-granulated or incompletely granulated fractions of melt, particularly lumps of melt or the like, and also fractions of the melt having a particularly high specific gravity, for example metal residues. Fraction B consists of satisfactorily granulated material having a predetermined mixing ratio between melt and fine-grained particles. Fraction C consists predominantly of fine-grained material and very fine-grained granulate, in which the proportion of finely divided particles is relatively high in relation to the proportion of melt. Fraction C is preferably delivered back to the container 18 for the fine-grained particles and, hence, is returned to the particle stream 10.

According to the invention, the granulate may of course be collected in more than three fractions in order to separate from one another more clearly defined mixing ratios between melt and fine-grained particles and/or grain sizes of the granulate.

It can be of advantage to collect the granulate 15 by means of a fluidized bed, particularly in the region of fraction B, in order to obtain rapid cooling and hardening of the granulate. According to the invention, the period for which the liquid melt is allowed to act on the fine-grained material can be made to differ by adopting a variable vertical difference between the point at which the melt film 8 and the stream 10 come into contact with one another and the plane in which the granulate is collected. Providing this vertical difference is large enough, the granulate will have solidified by the time it is collected, so that there is no longer any danger of agglomeration. The reaction time between the melt and the fine-grained material may also be adjusted in dependence upon the dropping height, which is of particular importance when chemical reactions take place between the melt and the fine-grained material.

Instead of using the projecting unit 12, it is also possible to use projecting units which, instead of the projecting wheel 14, comprise a second projecting belt similar to the projecting belt 16. In this case, the projecting belt 16 preferably has an elongate, rectilinear form in which the upper flight is flat, i.e. has no bends, and the projecting wheel 14 is replaced by a second, preferably somewhat shorter projecting belt arranged above the first projecting belt, the fine-grained material having delivered between both projecting belts.

Compressed air or gas under pressure, particularly an inert gas, for example argon, may also be used either exclusively or in combination with the above-mentioned accelerating units for accelerating the fine-grained particles.

The solid fine-grained particles consist preferably of sand (silicon dioxide), of fine-grained ferro alloys, of granular ceramic material or of granite powder which has a lower melting point than silicon dioxide and is therefore more favorable in terms of energy.

According to the invention, the heat transferred to the granulate 15 and/or to the fine-grained particles which are not attached to the melt may be recovered during collection of the granulate or the fine-grained material by arranging a heat exchanger, particularly in the form of tubular coils, below the collection plane. This recovery of heat is also of advantage, above all, when a fluidized bed is provided in the region of the collection plane. The heat recovered may be used as energy for maintaining the stream of fine-grained particles and/or the fluidized bed.

Figure 2:
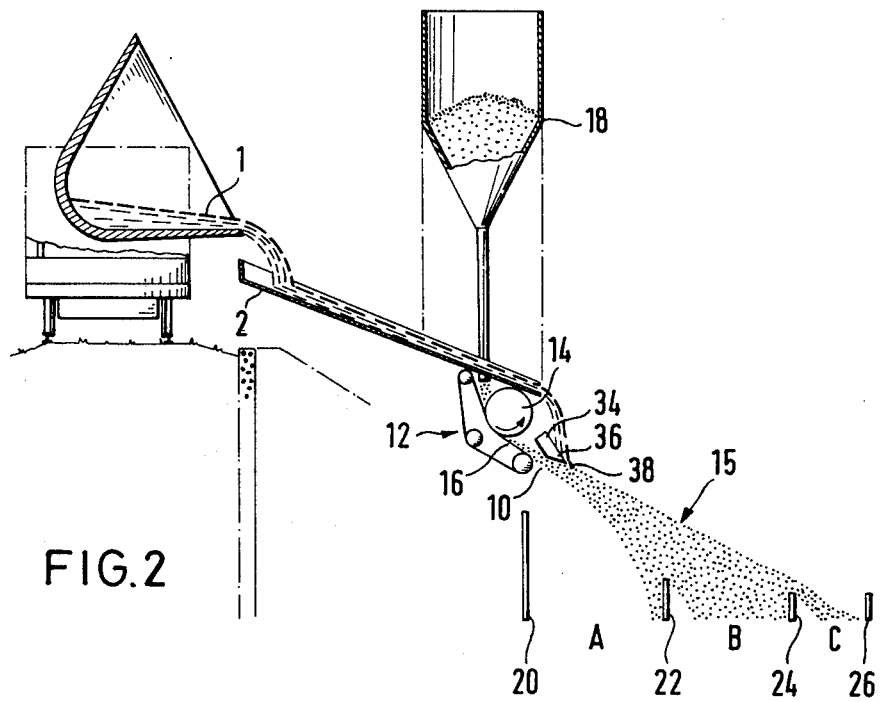
FIGS. 2 and 3 illustrate modified apparatus for carrying out the process of the invention.

The difference between the embodiment illustrated in FIG. 2 and the embodiment illustrated in FIG. 1 lies in the fact that a baffle plate 34 is used of which the lower section 36 is V-shaped and which is arranged in the angle between the flow of melt and the stream 10. This design and arrangement of the baffle plate 34 ensures that the stream 10 impinges on the flow 38 of melt, which is spread out by the baffle plate 34 into a thin film, immediately on leaving the baffle plate 34. Accordingly, the melt flow 38 has virtually no opportunity to shrink back into a circular or substantially circular cross-section under the effect of the high surface tension of the melt 1. Instead, immediately after leaving the V-shaped front section 36 of the baffle plate 34, the melt flow 38 which has been spread out into a film, is picked up and at least partly entrained by the stream 10. As a result of this entrainment by the stream 10 flowing at a considerably higher rate, the melt flow 38 is not only deflected or diverted in the direction of the stream 10, it is also drawn apart, thereby facilitating the formation of a relatively fine-grained granulate. Although it is virtually impossible in practice for the stream 10 directly to impinge on the melt flow 38 at the lower edge of the baffle plate 34, the interval between the lower edge of the baffle plate and the point at which the stream 10 impinges on the melt flow should be as narrow as possible. According to the invention, this interval is preferably less than 10 cm and more particularly less than 5 cm. This also applies to the arrangement adopted in the embodiment shown in FIG. 1. The remaining reference numerals in FIG. 2 denote components which are the same as the corresponding components in FIG. 1 so that there is no need for these reference numerals to be explained in any more detail. The baffle plate 34 is preferably vibrated at a frequency of 100 or 200 cycles per second in a direction parallel to its baffle surface, the vibration preferably being directed perpendicularly of the plane of the drawing, i.e. parallel to the pointed front edge of the V-shaped section 36. Vibration of the baffle plate 34 in this way facilitates separation of the melt stream 38 from the baffle plate 34.

Figure 3:
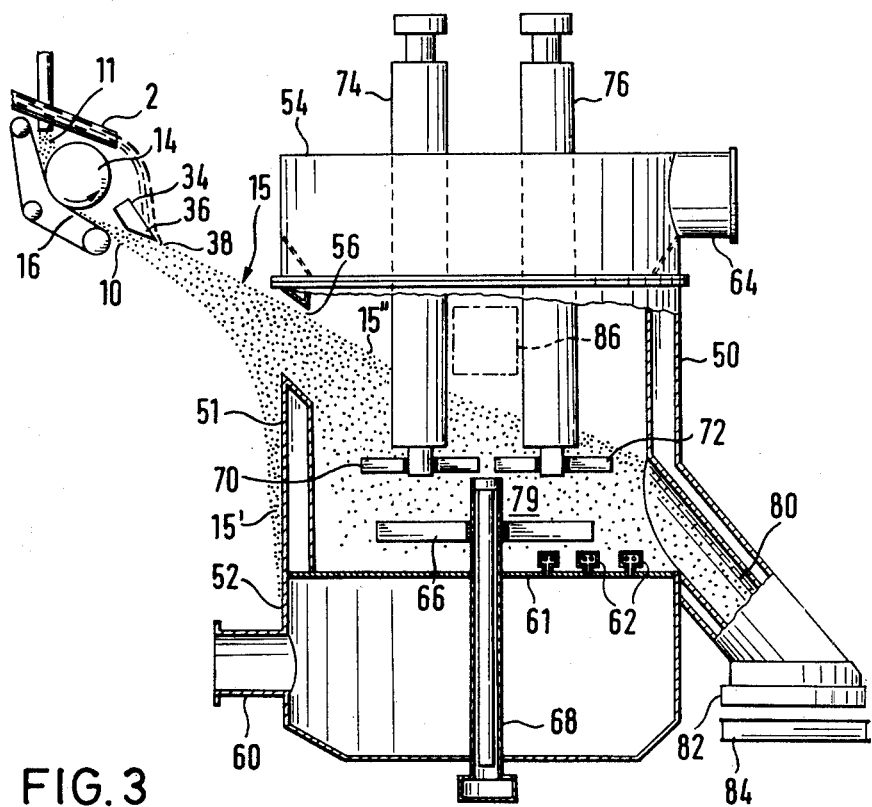

In the embodiment shown in FIG. 3, the granulate 15 is produced in the same way as in the embodiment shown in FIG. 2, except that the left-hand part of the apparatus shown in FIG. 2 has been broken away. In FIG. 3, recurring components have again been denoted by the same reference numerals as in FIG. 2 and FIG. 1. In the embodiment shown in FIG. 3, the granulate stream 15 is partly guided into the interior of a cylindrical double-walled container 50. The front wall 51 of the container 50 is provided with an opening 56 which preferably has a substantially rectangular cross-section. The front wall 51 of the container 50 acts as a partition which divides the granulate stream 15 into two component streams 15' and 15''. The container 50 comprises a trough 52 at its base and a head section 54. A fan (not shown) delivers compressed air to the trough 52 through a connecting pipe 60, the compressed air being guided through nozzles 62 provided in the base 61 into the interior of the double-walled container 50 where it maintains a fluidized stream of the granulate 15' entering the container 50. If the double walled container 50 has an internal diameter of 3 meters for example, it can be of advantage to provide the base 61 with approximately 300 nozzles 62, each nozzle 62 having for example 6 lateral jets. A suitable fan may deliver for example from 500 to 1000 cubic meters of air per minute to the container 50 through the base 61. Above the nozzle 62 there is a stirrer 66 of which the shaft 68 passes through the base 61 and the trough 52, the shaft 68 preferably being water-cooled. In addition, the stirrer 66 is surmounted by another two stirrers 70 and 72 of which the shafts 74 and 76 extend downward into the container 50. The shafts 74 and 76 are also preferably water-cooled.

The stirrers 66, 70 and 72 may be driven by means of electric motors (not shown) provided with a reduction gear. A fluidized bed generally denoted by the reference numeral 79 is formed inside the container 50 by the co-operation of the compressed air delivered through the nozzles 62 with the granulate 15''. The stirrers 66, 70 and 72 prevent the granulate from agglomerating. The granulate 15' is delivered through an outlet passage 80 to a sieve 82, where any lumps present in it are separated out, and is then carried off by means of a conveyor belt 84. The compressed air delivered through the base 61, which has become heated by contact with the hot granulate 15'' during its passage through the fluidized bed 79, is run off through an outlet 64 and may be used for heat recovery.

In the embodiment shown in FIG. 3, the inlet opening 56 and the outlet passage 80 are arranged on opposite sides of the container 50. However, it is of greater advantage to arrange the inlet opening and the outlet passage offset by about 90° rather than 180° relative to one another in order to prevent any of the granulate 15'' from directly passing to the outlet passage 80. An inlet opening arranged offset by 90° relative to the outlet passage 80 is indicated at 86. In addition, this arrangement of the inlet opening at 86 affords the advantage that most of the granulate 15'' entering the container 50 does not come into contact with the shafts 74 and 76 of the stirrers 70 and 72, but instead is delivered between them to the fluidized bed 79. In FIG. 3, the front wall 51 of the container 50 corresponds to the partition 22 in FIG. 1. Where the inlet openings 86 are arranged offset through 90° relative to the outlet passage 80, another outlet (not shown) may be provided in that wall of the container 50 which is opposite the inlet opening 86 to enable that part of the granulate corresponding to fraction C in FIG. 1 which, for the most part, consists of particles of the stream 10 which are not attached to the granulate to be removed from the container 50 separately from the rest of the granulate.

The operation of the apparatus shown in FIG. 3 is illustrated by the following Examples:

EXAMPLE 1

Blast furnace slag was granulated by the process according to the invention, powdered granite having a grain size of from up to 2 mm serving as the fine-grained solid particles 11 of the stream 10. The ratio of weight of melt to particles was 1:1. The stream of granulate was introduced into a fluidized bed 79 having a diameter of 3 meters. 600 cubic meters per minute of air were delivered to the fluidized bed through the base 61. On leaving the fluidized bed 79, the granulate has a temperature of 540° C. and the following composition:

| | CaO | $SiO_2$ | $Al_2O_3$ | MgO | FeO | $TiO_2$ | S | alkali |
|---|---|---|---|---|---|---|---|---|
| % by weight | 21.7 | 52.3 | 14.5 | 4.5 | 3.3 | 0.65 | 0.5 | 4.3. |

The granulate 15'' has a grain size of from up to 4 mm.

The granulate was melted in a tank and spun into mineral wool in a four-wheel spinner.

EXAMPLE 2

Steel slag was granulated by the process according to the invention, granulated material up to 4 mm in diameter consisting of a mixture of substantially insoluble crude phosphate, $NaCO_3$, FeSi and $SiO_2$ in a ratio of 68:20:5:7 being used for the stream 10 of granulated material.

The ratio of melt to solid fine-grained particles was 1:1. The fraction 15' of the granulate had a high metallic content from which the metal was preferably magnetically separated. After cooling and the magnetic removal of metal, the granulate 15'' was finely ground into a fertilizer having a phosphorus content of 6.2%, of which 5.0% were soluble in citric acid.

According to the invention, it is of particular advantage to granulate a melt 1 consisting essentially of steel slag by means of a stream 10 containing a fine-grained solid particles 11 which consist at least partly of limestone. In this case, the metallic inclusions, which accumulate in particular in the region of the fraction A or 15', are mixed with limestone particles which, on account of the high temperature of the melt, are at least partly converted into quicklime which is of particular advantage for the reuse of the metallic inclusions in the production of steel, because limestone and quicklime are always added in addition to carbon in the production of steel. In addition, the above mentioned addition of limestone particles affords the advantage that a large proportion of the limestone is converted into quicklime without any need for additional energy. In addition, it can be of advantage to add not only limestone particles but also particles of quicklime to the stream 10.

In the embodiments shown in FIGS. 1 to 3, the melt 1 is poured from an open ladle into a sloping channel 2 and impinges as an accelerated stream on a baffle plate 4 or 34 which spreads the melt stream into a film 8 or 38. In FIG. 1, the film 8 is directed substantially vertically downwards, whereas in FIGS. 2 and 3 the film 38 is inclined towards the vertical to a certain extent. In order to obtain more favorable spatial dimensions of the granulating apparatus used to practice the process according to the invention and/or to lengthen the reaction time between the melt and the stream 10 and/or to lengthen the cooling time of the granulate 15, it is possible in accordance with the invention for the melt flow or melt flows to be directed substantially horizontally or obliquely upwards. To this end, it can be of advantage to select for the melt 1 a container whch, at its base, comprises one or more openings in the form of jets, particularly slot jets (not shown), for the exit of melt streams, an excess pressure being applicable to the melt accommodated in the container, for example by means of a gas under pressure, so that the melt flows out from the above mentioned jets under pressure and the issuing melt streams can be directed horizontally or obliquely upwardly. In this modified apparatus, a corresponding direction is given to the stream 10 so that in this case, too, the incidence angle a between the melt flow and the stream 10 is preferably an acute angle, advantageously between about 10° and 50°. By means of melt flows directed obliquely upward, for example at an angle of from 45° to 70° relative to the horizontal, in conjunction with a correspondingly directed stream 10, it is possible to obtain a trajectory-parabola-like distribution of the granulate for favorable spatial dimensions of the apparatus used to practice the process of the invention. In this connection, it can be of advantage for the arrangement to be such that the melt flows and the stream 10 come into contact with one another in a closed container. In this case, the container in question may be filled with an inert gas, particularly argon. It can also be of advantage, particularly in the granulation of metal melts, for the stream 10 to consist solely of compressed air or a gas under pressure, particularly an inert gas, for example argon, which is only slightly soluble in the metal melt to be granulated. Where an inert gas is used for forming the stream 10, the gases included in the metal melt escape as the melt enters the inert gas stream and in doing so contribute towards dispersing and granulating the melt. The processes involved are described in detail in U.S. Pat. No. 2,826,489 (Wagner). Even in the case of melt flows directed horizontally or obliquely upwardly, the granulate may be collected in different fractions in dependence upon the distance from the point at which the melt flows and the stream 10 come into contact with one another. In this connection, the partitions 20, 22, 24 and 26 are best not only arranged staggered behind one another in the common plane of the melt flow and the stream 10, but are also arranged laterally of this plane at different intervals from the point at which the melt flows and the stream 10 come into contact with one another, in order to enable the relatively light, for example soiled, granulate particles travelling laterally further outwards from the above mentioned plane during dispersion of the melt to be more effectively separated from the heavier purely metallic granulate particles. To this end, the vertical partitions 22, 24 and 26 may be secured along substantially oval lines on the horizontal collecting surface for the granulate, the longitudinal axes of these oval lines lying in the plane behind by the melt flow and the stream 10 and the short axes of these oval lines extending substantially perpendicularly of that plane.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A process for granulating slag melts, glass melts, ceramic melts and melts of metal alloys, comprising the steps of:
   (A) creating a flowing stream of molten material;
   (B) widening said stream of molten material to form a melt film as it flows;
   (C) creating a substantially freely flowing stream of fine-grained, said particles;
   (D) imparting a rate of flow to the stream of solid particles that is greater than that of the melt film and directing the stream of solid particles in a substantially uniform direction against a widened side of said stream of molten material at an incidence angle which will atomize said stream of molten material into a fan-shaped distribution of droplets over at least part of an opposite angle to the incidence angle;
   (E) cooling said droplets into a substantially fine-grained granulate; and
   (F) collecting the fine-grained granulate.

2. The process of claim 1, wherein step (F) is performed at least partly by a air fluidized bed.

3. The process of claim 1 or 2, wherein step (F) includes the step of dividing the granulate into fractions in dependence upon the distance between a point of collection and a point at which the stream of solid particles intersects the melt film.

4. The process of claim 3, wherein the incidence angle is between about 5° and 90°.

5. The process of claim 4, wherein the incidence angle is between about 50° and 90°.

6. The process of claim 1 or 2, wherein the melt film formed in step (B) has a thickness of less than 10 mm.

7. The process of claim 1 or 2, wherein the speed imparted to the stream of solid particles in step (D) is from 5 to 100 m/sec.

8. The process of claim 6, wherein the speed imparted to the stream of solid particles in step (D) is from 5 to 100 m/sec.

9. The process of claim 4, wherein said incidence angle is between 20° and 90°.

10. The process of claim 5, wherein said incidence angle is 60°.

11. The process of claim 6, wherein the melt film is formed with a thickness less than 3 mm.

12. The process of claim 6, wherein said melt film is formed with a thickness less than 1 mm.

13. The process of claim 3, wherein the speed imparted to the stream of solid particles in step (D) is from 5 to 100 m/sec.

14. The process of claim 5, wherein the speed imparted to the stream of solid particles in step (D) is from 5 to 100 m/sec.

15. The process of claim 4, wherein said incidence angle is between about 20° and 40°.

16. The process of claim 15, wherein the speed imparted to the stream of solid particles in step (D) is from about 5 to 50 m/sec.

17. The process of claim 1, wherein the quantity by weight of solid particles delivered per unit of time and the weight of the melt delivered per unit of time are in a ratio to one another of from about 2:1 to 1:1.

18. The process of claim 1 or 2, wherein the stream of solid fine-grained particles is formed of particles that are not all the same with respect to at least one of their particle size and composition.

19. The process of claim 17, wherein the stream of solid fine-grained particles is formed of particles that are not all the same with respect to at least one of their particle size and composition.

20. The process of claim 1, wherein the molten material consists essentially of steel slag and said stream of solid particles is comprised at least in part of limestone.

21. The process of claim 17, wherein during step (F) at least one fraction of the granulate is collected by means of a air fluidized bed.

22. The process of claim 1, wherein the speed imparted to the stream of solid particles is from about 10 to 20 m/sec.

23. The process of claim 18, wherein said solid particles comprise two or more materials.

24. The process of claim 18, wherein said solid particles comprise two or more grain fractions.

25. The process of claim 23, wherein said solid particles comprise two or more grain fractions.

26. The process of claim 18, wherein said solid particles comprise different grain forms.

27. The process of claim 25, wherein said solid particles comprise different grain forms.

28. The process of claim 1 or 20, wherein said molten material consists essentially of steel slag and the stream of fine-grained solid particles is comprised at least in part of quick lime.

29. The process of claim 1 or 2, wherein step (B) is performed by impinging the melt upon a baffle plate so as to cause the melt to spread out into the melt film immediately upon leaving the baffle plate.

30. The process of claim 29, wherein step (D) is performed before the melt flow, upon leaving said baffle plate, can shrink into a substantially circular cross-section under the effect of surface tension of the molten material.

31. The process of claim 1, wherein the molten material is a blast furnace slag and the stream of solid particles is formed of sand particles having a grain size of up to 2 mm.

32. The process of claim 1, wherein the molten material is a blast furnace slag and the stream of solid particles is formed of sand particles having a grain size of up to 1 mm.

33. The process of claim 1 or 19, wherein the stream of solid fine-grained particles comprises at least one material which is added to and mixed with the molten material during step (D) in a fixed mixing ratio between the proportion of molten material and the proportion of fine-grained solid particles.

34. The process of claim 33, wherein said fine-grained particles are comprised of powdered granite for use in producing mineral wool from said granulate.

35. The process of claim 33, wherein said fine-grained particles are comprised of a phosphate mixture for use in producing fertilizer from said granulate.

36. The process of claim 2 or 21, comprising the step of extracting heat from the granulate and free fine-grained solid particles which are not bound to the granulate during step (F).

37. The process of claim 36, wherein the heat extracted during the heat extracting step is transferred to the air of the fluidized bed.

* * * * *